United States Patent
Zanibelli et al.

(10) Patent No.: US 7,160,439 B2
(45) Date of Patent: Jan. 9, 2007

(54) CATALYTIC COMPOSITION FOR THE UPGRADING OF HYDROCARBONS HAVING BOILING POINTS WITHIN THE NAPHTHA RANGE

(75) Inventors: Laura Maria Zanibelli, Crema (IT); Virginio Arrigoni, Milan (IT); Marco Ferrari, Milan (IT); Donatella Berti, S. Donato Milanese (IT)

(73) Assignees: AgipPetroli S.p.A., Rome (IT); EniTecnologie S.p.A., San Donato Milanese (IT)

(*) Notice: Subject to any disclaimer, the term of this patent is extended or adjusted under 35 U.S.C. 154(b) by 0 days.

(21) Appl. No.: 10/777,225

(22) Filed: Feb. 13, 2004

(65) Prior Publication Data

US 2004/0222132 A1    Nov. 11, 2004

Related U.S. Application Data

(63) Continuation of application No. 09/539,877, filed on Mar. 31, 2000, now abandoned.

(30) Foreign Application Priority Data

May 7, 1999    (IT)    ............................. MI99A1002

(51) Int. Cl.
*C10G 45/04*    (2006.01)
(52) U.S. Cl. ............ 208/213; 208/216 R; 208/216 PP; 208/217
(58) Field of Classification Search .............. 208/213, 208/216 R, 216 PP, 217
See application file for complete search history.

(56) References Cited

U.S. PATENT DOCUMENTS

| | | |
|---|---|---|
| 3,156,640 A | 11/1964 | Hart |
| 4,628,717 A | 12/1986 | Blum |
| 4,808,560 A | 2/1989 | Oleck |
| 5,053,373 A | 10/1991 | Zones |
| 5,378,352 A | 1/1995 | Degnan et al. |
| 5,482,617 A | 1/1996 | Collins et al. |
| 5,576,256 A | 11/1996 | Monque et al. |
| 5,846,406 A | 12/1998 | Sudhakar et al. |
| 6,338,793 B1 | 1/2002 | Putman |
| 2004/0222132 A1 | 11/2004 | Zanibelli et al. |

FOREIGN PATENT DOCUMENTS

| | | |
|---|---|---|
| EP | 340868 | 11/1989 |
| EP | 0 442 159 | 8/1991 |
| EP | 0 448 117 | 9/1991 |
| EP | 0 449 144 | 10/1991 |
| EP | 0 543 157 | 5/1993 |
| EP | 0 550 922 | 7/1993 |
| EP | 0 665 280 | 8/1995 |
| EP | 0 908 231 | 4/1999 |
| GB | 878 035 | 9/1960 |
| GB | 2 051 120 | 1/1981 |
| JP | 61/126196 | 6/1986 |

OTHER PUBLICATIONS

U.S. Appl. No. 10/151,167, filed May 21, 2002, Zanibelli et al.
U.S. Appl. No. 10/777,225, filed Feb. 13, 2004, Zanibelli et al.
U.S. Appl. No. 10/819,211, filed Apr. 7, 2004, Zanibelli et al.
U.S. Appl. No. 10/528,813, filed Mar. 23, 2005, Zanibelli et al.

*Primary Examiner*—Tam M. Nguyen
(74) *Attorney, Agent, or Firm*—Oblon, Spivak, McClelland, Maier & Neustadt, P.C.

(57) ABSTRACT

A process is described for the upgrading of hydrocarbon mixtures which boil within the naphtha range containing sulfur impurities, i.e. a hydrodesulfuration process with contemporaneous skeleton isomerization and reduced hydrogenation degree of the olefins contained in said hydrocarbon mixtures, the whole process being carried out in a single step. The process is carried out in the presence of a catalytic system comprising a metal of group VI B, a metal of group VIII and a carrier of acid nature consisting of a mesoporous silico-alumina.

15 Claims, No Drawings

CATALYTIC COMPOSITION FOR THE UPGRADING OF HYDROCARBONS HAVING BOILING POINTS WITHIN THE NAPHTHA RANGE

CROSS-REFERENCE TO RELATED APPLICATIONS

The present application is a continuation of application Ser. No. 09/539,877 filed Mar. 31, 2000, now abandoned.

BACKGROUND OF THE INVENTION

1. Field of the Invention

The present invention relates to a process for the upgrading of hydrocarbon mixtures which boil within the naphtha range containing sulfur impurities, i.e. a hydrodesulfuration process with contemporaneous skeleton isomerization and reduced hydrogenation degree of the olefins contained in said hydrocarbon mixtures, the whole process being carried out in a single step. The process is effected in the presence of a catalytic system comprising a metal of group VI B, a metal of group VIII and a carrier of acid nature consisting of a mesoporous silico-alumina.

2. Description of the Background

This catalytic system can be used, in particular, for the upgrading of mixtures of hydrocarbons which boil within the naphtha range deriving from cracking processes, preferably mixtures of hydrocarbons having a boiling point within the naphtha range deriving from FCC catalytic cracking (Fluid Catalytic Cracking).

Hydrocarbons which boil within the naphtha range deriving from FCC (i.e. gasoline cut) are used as blending component of gasolines. For this purpose, it is necessary for them to have a high octane number together with a low sulfur content, to conform with the law restrictions which are becoming increasingly more severe, in order to reduce the emission of contaminants. The sulfur present in gasoline mixtures in fact mainly comes (>90%) from the gasoline cut deriving from FCC.

This cut is also rich in olefins which have a high octane number. Hydrogenation processes used for desulfuration also hydrogenate the olefins present with a consequent considerable reduction in the octane number (RON and MON). The necessity has therefore been felt for finding a catalytic system which decreases the sulfur content in hydrocarbon mixtures which boil within the naphtha range and, at the same time, minimizes the octane loss (RON and MON), which can be achieved, for example, by the skeleton isomerization of the olefins present and/or by inhibiting the hydrogenation of the olefinic double bond.

The use of zeolites with a medium pore dimension as isomerization catalysts and the consequent recovery of octane in the charges already subjected to desulfuration are already known (U.S. Pat. No. 5,298,150, U.S. Pat. No. 5,320,742, U.S. Pat. No. 5,326,462, U.S. Pat. No. 5,318,690, U.S. Pat. No 5,360,532, U.S. Pat. No. 5,500,108, U.S. Pat. No. 5,510,016, U.S. Pat. No. 5,554,274, U.S. Pat. No. 5,994,39). In these known processes, in order to obtain hydrodesulfuration with a reduced octane loss, it is necessary to operate in two steps, using in the first step catalysts suitable for desulfuration and in the second step catalysts for recovering the octane number.

U.S. Pat. No. 5,378,352 describes a process in a single step for desulfurating hydrocarbon fractions, with boiling points within the range of gasolines, using a catalyst which comprises a metal of group VIII, a metal of group VI B and a zeolite.

MI97A. 002288 describes a catalytic system capable of isomerizing n-paraffins having a number of carbon atoms higher than 15 which comprises:

a) a carrier of acid nature consisting of a silica and alumina gel, amorphous to X-rays, with a molar ratio $SiO_2/Al_2O_3$ ranging from 30/1 to 500/1, having a surface area of 500 to 1000 $m^2/g$, a porosity ranging from 0.3 to 0.6 ml/g and a pore diameter within the range of 10–40 Å;

b) a mixture of metals belonging to groups VI B and VIII deposited on the carrier in an overall quantity of 2 to 50% by weight with respect to the total of (a)+(b).

The acid carrier of the catalyst preferably has a ratio $SiO_2/Al_2O_3$ ranging from 50/1 to 300/1 and a porosity of 0.4 to 0.5 ml/g.

The mixture of metals (b) preferably consists of a metal of group VI B selected from molybdenum and tungsten, in a quantity ranging from 5 to 35% by weight, and a non-noble metal of group VIII selected from nickel and cobalt, in a quantity ranging from 0.1 to 5% by weight.

The carrier based on silica and alumina gel can be conveniently prepared according to what is described in the patent U.S. Pat. No. 5,049,536 or in patent application EP 659478. This carrier can be used as such for the deposition of the metal phase (b) or in extruded form, as described for example in EP 550922 and EP 665055. The metal phase (b) of the catalyst can be introduced by means of aqueous impregnation by wetting the carrier, or extruded carrier, with an aqueous solution of a compound of a metal of group VI B, and drying the resulting product which is then impregnated with an aqueous solution of a compound of the metal of group VIII and dried again. Calcination is then carried out in an oxidating atmosphere at a temperature ranging from 200 to 600° C. Alternatively, a single aqueous solution containing both the compounds of the metals of groups VI B and VIII can be used for contemporaneously introducing these metals. In the case of alcohol impregnation, the acid carrier is suspended in an alcohol solution containing both compounds of the metals of groups VI B and VIII. After impregnation, the solid is dried and calcined.

These catalytic compositions are useful in the hydroisomerization of n-paraffins having a number of carbon atoms higher than 15 to obtain bases for lubricating oils characterized by a low "pour point", and a high viscosity index.

SUMMARY OF THE INVENTION

It has now been surprisingly found that with the use of these catalytic compositions, optionally also containing a higher percentage of metals, it is possible to desulfurate, with high conversion values, mixtures of hydrocarbons that boil within the naphtha range containing sulfur and olefins and contemporaneously obtain the skeleton isomerization of the olefins present with a low hydrogenation degree of the olefinic double bond. This catalytic system is also active at temperatures and pressures that are lower than those preferably used in the known art for hydrodesulfuration.

DETAILED DESCRIPTION OF THE PREFERRED EMBODIMENTS

Both skeleton isomerization and reduced olefinic hydrogenation enable hydrocarbon mixtures to be obtained, which boil within the naphtha range with very low RON (research octane number) and MON (motor octane number) losses.

The results obtained do not only relate to the desulfuration of hydrocarbon cuts that boil within the "heavy naphtha" range (130° –250° C.), i.e. cuts poor in olefins, but also feeds of "full range naphtha", which boil within the range of 35° –250° C., i.e. in the case of cuts rich in olefins. In fact, the process of the present invention gives a high selectivity for desulfuration with a reduced hydrogenating activity, which represents an additional advantage in terms of octane recovery in the end-gasoline.

A first object of the present invention therefore relates to a hydrodesulfuration process of hydrocarbon mixtures having boiling ranges within the range of $C_4$ to 250° C., containing olefins and at least 150 ppm of sulfur, with the contemporaneous skeleton isomerization of these olefins, which comprises putting said hydrocarbon mixtures in contact, in the presence of hydrogen, with a catalytic composition comprising:

a) a carrier of acid nature consisting of a silica and alumina gel, amorphous to X-rays, with a molar ratio $SiO_2/Al_2O_3$ ranging from 30/1 to 500/1, having a surface area ranging from 500 to 1000 $m^2/g$, a porosity ranging from 0.3 to 0.6 ml/g and a pore diameter within the range of 10–40 Å;

(b) a mixture of metals belonging to groups VI B and VIII deposited on the carrier in an overall quantity of 2 to 67% by weight with respect to the total weight of (a)+(b).

The acid carrier of the catalyst preferably has a ratio $SiO_2/Al_2O_3$ ranging from 50/1 to 300/1 and a porosity of 0.4 to 0.5 ml/g.

According to a preferred aspect of the present invention, the mixture of metals (b) consists of a metal of group VI B, preferably selected from molybdenum and tungsten, and a metal of group VIII, preferably selected from cobalt and nickel.

According to a particularly preferred aspect of the present invention the mixture of metals (b) consists of molybdenum and cobalt.

The metal of group VI B is preferably in a quantity ranging from 5 to 50% by weight with respect to the total weight of (a)+(b), even more preferably in a quantity ranging from 8 to 30% by weight. The metal of group VIII is in a quantity ranging from 0.5 to 10% by weight with respect to the total of (a)+(b), even more preferably in a quantity ranging from 1 to 5% by weight.

The weight percentages of the metal of group VI B and of the metal of group VIII refer to the metal content expressed as metal element of group VI B and metal element of group VIII; in the end-catalyst, after calcination, these metals are in the form of an oxide. According to a particularly preferred aspect the molar ratio between the metal of group VIII and the metal of group VI is less than or equal to 2, preferably less than or equal to 1.

The silica and alumina gel carrier can be conveniently prepared as described in U.S. Pat. No. 5,049,536, in EP 659,478 or in EP 812804. In particular, an aqueous solution is prepared, of a tetra-alkyl ammonium hydroxide (TAA-OH), wherein alkyl is for example n-propyl or n-butyl, a soluble compound of aluminum capable of hydrolyzing in $Al_2O_3$ and a soluble compound of silicon capable of hydrolyzing in $SiO_2$, the quantity of reagents in solution being such as to respect the following molar ratios:
$SiO_2/Al_2O_3$ from 30/1 to 500/1;
TAA-OH/$SiO_2$ from 0.05/1 to 0.2/1;
$H_2O/SiO_2$ from 5/1 to 40/1.

The solution thus obtained is heated to gelation, the gel obtained is dried and is calcined in an inert atmosphere and then in an oxidating atmosphere.

The acid carrier (a) of the catalyst which is used in the process of the present invention can be used as such or in the form of an extruded product with traditional ligands, such as for example aluminum oxide, bohemite or pseudobohemite. The carrier and ligand can be premixed in weight ratios ranging from 30:70 to 90:10, preferably from 50:50 to 70:30. At the end of the mixing, the product obtained is consolidated into the desired end-form, for example into the form of extruded cylinders or tablets. According to a preferred aspect the silica and alumina gel carrier (a) can be bound with bohemite or pseudobohemite as described in EP 550,992. Even more preferably the material is used in extruded form as described in EP 665,055, consisting of an inert ligand and silica and alumina gel obtained as follows:

a) preparing an aqueous solution of a tetraalkylammonium hydroxide (TAA-OH), a soluble compound of aluminum capable of hydrolyzing in $Al_2O_3$ and a silicon compound capable of hydrolyzing in $SiO_2$, in the following molar ratios:
$SiO_2/Al_2O_3$ from 30/1 to 500/1;
TAA-OH/$SiO_2$ from 0.05/1 to 0.2/1;
$H_2O/SiO_2$ from 5/1 to 40/1;

b) heating the solution thus obtained to cause hydrolysis and gelation and obtain a mixture A with a viscosity ranging from 0.01 to 100 Pa sec;

c) adding to the mixture A first a ligand belonging to the group of bohemites or pseudobohemites, in a weight ratio with the mixture A of 0.05 to 0.5, and then a mineral or organic acid in a quantity ranging from 0.5 to 8 g per 100 g of ligand;

d) mixing and heating the mixture obtained under point (c) to a temperature ranging from 40° to 90° C. until a homogeneous paste is obtained, which is subjected to extrusion;

e) drying of the extruded product and calcination in an oxidating atmosphere.

As far as the metal phase (b) of the catalyst is concerned, it can be introduced by means of aqueous or alcohol impregnation. According to the first technique, the silica and alumina gel, also in extruded form, is wetted with an aqueous solution of a compound of a metal of Group VIB, for example ammonium heptamolybdate, the resulting product is dried, is optionally calcined, and is then impregnated with an aqueous solution of a compound of the metal of Group VIII, for example cobalt nitrate. It is then dried and calcined in an oxidizing atmosphere ranging from 200 to 600° C. Alternatively a single aqueous solution containing both compounds of the metals of Groups VIB and VIII can be used for contemporaneously introducing these metals.

In the case of alcohol impregnation, the acid carrier is suspended in an alcohol solution containing both compounds of the metals of groups VI B and VIII. After impregnation the solid is dried and calcined.

The catalysts used in the present invention wherein component (b) corresponds to a mixture of metals belonging to groups VI B and. VIII, preferably cobalt and molybdenum, deposited on the carrier in an overall quantity of over 50% and less than or equal to 67% by weight with respect to the total of (a)+(b), are new and are a further object of the present invention. According to a preferred aspect these new catalytic compositions contain the metal of group VI B in a quantity greater than 45% and less than or equal to 57% by weight with respect to the total weight of (a)+(b), and the metal of group VIII in a quantity ranging from 5 to 10% by weight with respect to the total weight of (a)+(b).

A further object of the present invention also relates to a catalytic composition comprising:

a) a carrier of acid nature consisting of a silica and alumina gel, amorphous to X-rays, with a molar ratio $SiO_2/Al_2O_3$ ranging from 30/1 to 500/1, having a surface area ranging from 500 to 1000 $m^2/g$, a porosity ranging from 0.3 to 0.6 ml/g and a pore diameter within the range of 10–40 Amstrongs;

(b) a mixture of cobalt and molybdenum deposited on the carrier in an overall quantity of 2 to 50% by weight with respect to the total weight of the catalytic composition (a)+(b).

The process of the present invention is preferably carried out at a temperature ranging from 220° to 360° C., even more preferably from 250° to 330° C., at a pressure ranging from 5 to 20 kg/cm², even more preferably from 5 to 10 kg/cm², at a WHSV ranging from 1 to 10 hours⁻¹, even more preferably from 2 to 6 hours⁻¹. The quantity of hydrogen ranges from 100 to 500 times the quantity of hydrocarbons present (Nl/l), even more preferably from 200 to 400 times.

The hydrocarbon mixture which can be desulfurated according to the present invention contains more than 150 ppm of sulfur. For example hydrocarbon mixtures with a sulfur content of more than 600 ppm, or even higher than 10000 ppm can be subjected to hydrodesulfuration.

The hydrocarbon mixtures which are subjected to hydrodesulfuration according to the process of the present invention are mixtures having boiling ranges within the range of $C_4$ to 250° C., wherein $C_4$ refers to the boiling temperature of a mixture of hydrocarbons having four carbon atoms, and hydrocarbon mixtures boiling within the naphtha range, i.e. having boiling ranges within the range of $C_5$ to about 220° C., wherein $C_5$ refers to the boiling temperature of a mixture of hydrocarbons with five carbon atoms, are preferably subjected to hydrodesulfuration.

The catalysts of the present invention are activated, before use, by sulfidation according to the known methods. For example the sulfidation process can be effected in a reducing atmosphere of $H_2S/H_2$ at a temperature of 300–500° C. or by treatment with carbon sulfide in a reducing atmosphere again at 300–500° C.

EXAMPLE 1

Preparation of Catalyst A 2 g of aluminum isopropylate are dissolved at room temperature in 68.5 g of aqueous solution of tetrapropylammonium hydroxide (TPA-OH at 13.35% by weight). The solution is heated to 60° C. and 104.1 g of tetraethylsilicate (TES) are added. The resulting mixture has the following ratios:

$SiO_2/Al_2O3=102$, $TPA-OH/SiO_2=0.09$

On maintaining this mixture under stirring at 60° C. for 40 minutes, a homogeneous gel is formed which is dried in a stream of air at 90° C. and then calcined at 550° C. in a stream of nitrogen for 3 hours and subsequently a stream of air for a further 10 hours at the same temperature. A silica and alumina gel carrier (a) is obtained, which is amorphous to X-rays, with a quantitative yield with respect to the materials initially charged, with a pore diameter ranging from 10 to 40 Å, a porosity of 0.47 ml/g.

The gel thus obtained is bound with pseudobohemite, the latter in a quantity of 39% by weight with respect to the total weight of the calcined silica and alumina gel plus the ligand, extruded into cylindrical pellets and ground (40–70 mesh, $A_{sup} = 660$ m²/g). 10 g of the material thus obtained are then impregnated with 25 ml of aqueous solution containing 10.3 g of $(NH_4)_6Mo_7O_{24}*4H_2O$ $(NH_4)_6Mo_7O_{24}·4H_2O$ (Ammonium heptamolybdate, hereafter called EMA) and left to rest at room temperature for 20 hours. The mixture is then dried in an oven in air at 110° C. for 2 hours. The dried product is subsequently impregnated with 12 ml of aqueous solution containing 1.17 g of $Co(NO_3)_2·6H_2O$ (Cobalt nitrate, hereafter called CoN), the whole mixture being left to rest at room temperature for 20 hours. It is then dried in an oven in air at 110° C. for 1.5 hours and calcined at 500° C. for 4 hours, in air (rising rate: 180° C/hour). The chemical analysis of catalyst A relating to the metal content is indicated in Table 1.

EXAMPLE 2

Preparation of Catalyst A1

2 g of aluminum isopropylate are dissolved at room temperature in 68.5 g of aqueous solution of tetrapropylammonium hydroxide (TPA-OH at 13.35% by weight). The solution is heated to 60° C. and 104.1 g of tetraethylsilicate (TES) are added. The resulting mixture has the following ratios:

$SiO_2/Al_2O_3=102$, $TPA-OH/SiO_2=0.09$

The temperature is maintained at 60–65° C. until a mixture A having a viscosity of 0.011 Pa sec, is obtained. This mixture, after aging at room temperature for 20 hours, is put in a mixer and pseudobohemite Versal 150 (La Roche) in a quantity of 39% by weight with respect to the end weight of extruded silica and alumina gel, component a) with ligand, and 2.16 g of methylcellulose (Methocel Fluka 64625), are added, under mixing. After about an hour of mixing 0.26 g of glacial acetic acid are added and the temperature of the paste-mixer jacket is brought to about 50–60° C. The mixing is containing under heating until a homogeneous paste having a consistency suitable for extrusion, is obtained. At the end of the extrusion, aging is carried out for a night at room temperature, followed by drying at 100° C. for 5 hours and calcination at 550° C. for 8 hours in air. 10 g of the extruded silica and alumina gel, component a) with ligand thus obtained are then impregnated with 25 ml of an aqueous solution containing 10.3 g of $(NH_4)_6Mo_7O_{24}·4H_2O$ (Ammonium heptamoldibdate, hereafter called EMA) and left to rest at room temperature for 20 hours. The mixture is then dried in an oven in air at 110° C. for 2 hours. The dried product is subsequently impregnated with 12 ml of aqueous solution containing 1.17 g of Co$(NO_3)_2*6H_2O$ (Cobalt nitrate, hereafter called CoN), the whole mixture being left to rest at room temperature for 20 hours. It is then dried in an oven in air at 110° C. for 1.5 hours and calcined at 500° C. for 4 hours, in air (rising rate: 180° C/hour). The chemical analysis of catalyst Al relating to the metal content is the same as that for catalyst A.

EXAMPLE 3

Preparation of Catalyst B 10 g of the silica and alumina gel prepared, extruded and ground as described in example 1 are impregnated with 22 ml of aqueous solution containing 3.5 g of EMA and left to rest at room temperature for 20 hours. The mixture is then dried in an oven in air at 100° C., for 2 hours. The dried product is subsequently impregnated with 12 ml of aqueous solution containing 2.46 g of CoN, the whole mixture being left to rest at room temperature for 23 hours. It is then dried in an oven in air at 100° C. for 6 hours and calcined at 550° C. for 4 hours, in air (rising rate: 180° C/hour). The chemical analysis of the catalyst relating to the metal content is indicated in Table 1.

EXAMPLE 4

Preparation of Catalyst C 13.3 g of the silica and alumina gel prepared, extruded and ground as described in example 1 are impregnated with 29.2 ml of aqueous solution containing 2.5 g of EMA and left to rest at room temperature for 18 hours. The mixture is then dried in an oven in air at 100° C., for 2 hours. The dried product is subsequently impregnated with 29.2 ml of aqueous solution containing 1.75 g of CoN, the whole mixture being left to rest at room temperature for 20 hours. It is then dried in an oven in air at 100° C. for 2 hours and calcined at 550° C. for 4 hours, in air (rising rate: 180° C/hour). The chemical analysis of the catalyst relating to the metal content is indicated in Table 1.

EXAMPLE 5

Preparation of Catalyst D

The same procedure is adopted as in example 4, but using an acid silica and alumina gel carrier with a ratio $SiO_2/Al_2O_3=204$, extruded but not ground. This carrier is prepared as described in example 1 using a quantity of TES equal to 208.2 g.

EXAMPLE 6

Preparation of Catalyst E

The same procedure is adopted as in example 5, except that the silica and alumina gel carrier is ground after extrusion to 40–70 mesh.

EXAMPLE 7

Comparative Catalyst F

A commercial catalyst is used, containing cobalt and molybdenum impregnated on y-alumina. The chemical analysis of the catalyst relating to the metal content is indicated in Table 1.

EXAMPLE 7A

Preparation of Catalyst G—Comparative

A comparative catalyst is prepared by introducing cobalt and molybdenum during the synthesis of the acid silica and alumina gel carrier as described in EP 748652.

3.3 g of CoN are dissolved in 47.48 g of BuOH, under continuous stirring at 60° C. for 15 minutes; 1.0 g of $Si(OC_2H_5)_4$ (tetraethylorthosilicate, TES) and 25.1 g of $Al(OC_4H_9)_3$, (aluminum sec-butoxide) are then added, and the stirring continued at 60° C., for 15 minutes. Suspension G1 is obtained.

3.2 g of EMA are dissolved in 33.0 g of $(C_3H_7)_4NOH$ (Tetrapropylammonium hydroxide, solution at 19.2%) at room temperature, obtaining solution G2).

Solution G2) is poured into suspension G1), under stirring, at 80° C., these conditions being maintained for 1 h. This is followed by aging at room temperature for 16 h, drying in a vacuum oven at 100° C. for 6 h, and calcination in muffle according t6 the following temperature program: heating to 200° C. (5° C./min); pause at 200° C. for 2 h; heating to 550° C. (5° C./min); pause at 550° C. for 3 h; spontaneous cooling to room temperature.

Table 1 summarizes the physico-chemical characteristics and chemical analysis for catalysts A–E according to the process of the present invention and for comparative catalysts F and G.

In particular the chemical analysis relates to the metal content expressed as weight percentage of Co and Mo and as their molar ratio:

TABLE 1

| Catal. | Co/Mo | Mo (wt %) | Co (wt %) | $A_{sup}$ (m²/g) |
|---|---|---|---|---|
| A | 0.069 | 44.2 | 1.9 | 310 |
| B | 0.37 | 16.0 | 3.6 | 260 |
| C | 0.35 | 10.7 | 2.3 | 370 |
| D | 0.45 | 8.2 | 2.2 | 370 |
| E | 0.45 | 8.3 | 2.3 | 440 |
| F | 0.43 | 12.0 | 3.2 | 245 |
| G | 0.61 | 18.1 | 6.8 | 430 |

Tests on Model Charge

The performances of catalysts B, C and E are provided hereunder, obtained using the so-called "model charge" as feed, which represents the typical composition of FCC gasoline, in terms of S content and percentage of olefins. The model charge consists of:

30 wt % of 1-pentene;

0.25 wt % of thiophene, equal to about 1000 ppm S;

the complement to 100 is n-hexane.

The operating conditions are selected so as to obtain conversions higher than 90% (as HDS) and are kept relatively bland (250° C.<T<300° C.); $H_2$ is fed at $P_{H2}$=10 bars.

The parameters selected for evaluating the catalytic activity are:

HDS conversion % equal to 100×(ppm $S_{in}$-ppm $S_{out}$)/$S_{in}$;

ISO isomerizing activity %, equal to 100×(i-pentanes+i-pentenes)/SUM $C_5$;

HYD hydrogenating activity %, equal to 100×n-pentane$_{out}$/1 pentene$_{in}$;

HDS/HYD ratio, measurement of the selectivity of the catalyst towards desulfuration;

HYD/ISO ratio, inversely proportional to the selectivity towards branched products.

The catalysts are all activated with the same procedure in a stream of $H_2S/H_2$.

EXAMPLE 8

Activity of Catalyst B 2 g of catalyst B prepared according to example 3, diluted with corindone, are charged into a reactor (40–70 mesh) and activated by a stream of the mixture $H_2S/H_2$ (10% vol $H_2S$), at 400° C., for 3 hours; the system is then brought under a pressure of $H_2$ up to 10 bars, with T=250° C. The model charge is sent to the catalytic bed, with a ratio $H_2$/hydrocarbon charge of 300 Nl/l. The operating conditions and catalytic results are indicated in Table 2.

TABLE 2

| T (° C.) | WHSV (h⁻¹) | HDS % | ISO % | HYD % | HDS/HYD | HYD/ISO |
|---|---|---|---|---|---|---|
| 286 | 4.06 | 96.7 | 37.4 | 38.3 | 2.5 | 1.0 |
| 288 | 6.23 | 94.4 | 26.4 | 38.3 | 2.5 | 1.4 |
| 269 | 4.06 | 89.9 | 21.5 | 34.1 | 2.6 | 1.6 |

EXAMPLE 9

Activity of Catalyst C 2 g of catalyst C prepared according to example 4, diluted with corindone, are charged into a reactor (40–70 mesh) and activated by a stream of the mixture $H_2S/H_2$ (10% vol $H_2S$), at 400° C., for 3 hours; the system is then brought under a pressure of $H_2$ up to 10 bars, with T=250° C. The model charge is sent to the catalytic bed, with a ratio $H_2$/hydrocarbon charge of 300 Nl/l. The operating conditions and catalytic results are indicated in Table 3.

TABLE 3

| T (° C.) | WHSV (h⁻¹) | HDS % | ISO % | HYD % | HDS/HYD | HYD/ISO |
|---|---|---|---|---|---|---|
| 287 | 6.12 | 96.3 | 43.1 | 30.5 | 3.2 | 0.7 |
| 271 | 4.21 | 94.1 | 36.1 | 30.2 | 3.1 | 0.8 |
| 287 | 4.21 | 96.6 | 34.6 | 43.1 | 2.2 | 1.2 |

EXAMPLE 10

Activity of Catalyst E 2 g of catalyst E prepared according to example 6, diluted with corindone, are charged into a reactor (40–70 mesh) and activated by a stream of the mixture $H_2S/H_2$ (10% vol $H_2S$), at 400° C., for 3 hours; the system is then brought under a pressure of $H_2$ up to 10 bars, with T=250° C. The model charge is sent to the catalytic bed, with a ratio $H_2$/hydrocarbon charge of 300 Nl/l. The operating conditions and catalytic results are indicated in Table 4.

TABLE 4

| T (° C.) | WHSV (h$^{-1}$) | HDS % | ISO % | HYD % | HDS/HYD | HYD/ISO |
|---|---|---|---|---|---|---|
| 287 | 4.1 | 98.2 | 30.1 | 50.9 | 1.9 | 1.7 |
| 288 | 6.1 | 96.8 | 26.3 | 45.3 | 2.1 | 1.7 |
| 270 | 4.1 | 93.3 | 17.8 | 44.7 | 2.1 | 2.5 |

EXAMPLE 11

Activity of Catalyst F—Comparative 2 g of catalyst F prepared according to example 7, diluted with corindone, are charged into a reactor (40–70 mesh) and activated by a stream of the mixture $H_2S/H_2$ (10% vol $H_2S$), at 400° C., for 3 hours; the system is then brought under a pressure of $H_2$ up to 10 bars, with T=250° C. The model charge is sent to the catalytic bed, with a ratio $H_2$/hydrocarbon charge of 300 Nl/l. The operating conditions and catalytic results are indicated in Table 5.

TABLE 5

| T (° C.) | WHSV (h$^{-1}$) | HDS % | ISO % | HYD % | HDS/HYD | HYD/ISO |
|---|---|---|---|---|---|---|
| 250 | 4.0 | 89.7 | 2.5 | 37.4 | 2.4 | 15.0 |
| 270 | 4.0 | 100.0 | 2.6 | 80.6 | 1.2 | 31.0 |

EXAMPLE 12

Activity of Catalyst G—Comparative 2 g of catalyst F prepared according to example 7a, diluted with corindone, are charged into a reactor (40–70 mesh) and activated by a stream of the mixture $H_2S/H_2$ (10% vol $H_2S$), at 400° C., for 3 hours; the system is then brought under a pressure of $H_2$ up to 10 bars, with T 250° C. The model charge is sent to the catalytic bed, with a ratio $H_2$/hydrocarbon charge of 300 Nl/l. The operating conditions and catalytic results are indicated in Table 6.

TABLE 6

| T (° C.) | WHSV (h$^{-1}$) | HDS % | ISO % | HYD % | HDS/HYD | HYD/ISO |
|---|---|---|---|---|---|---|
| 293 | 3.9 | 91.5 | 0.8 | 86.0 | 1.1 | 107.5 |
| 274 | 3.9 | 92.1 | 0.7 | 89.9 | 1.0 | 128.4 |

These tables demonstrate the greater isomerizing activity of the catalysts of the present invention (B, C and E), both in absolute terms (ISO %) and relating to the hydrogenating capacity (HYD/ISO).

A similar comparison between the formulations B, C and E, on the one hand, and F and G on the other, can be based on the respective performances under the same operating conditions (WHSV=4 hours$^{-1}$; T=270° C., as indicated in Table 7).

TABLE 7

| Catalyst | HDS (%) | ISO (%) | HDS/HYD | HYD/ISO |
|---|---|---|---|---|
| B | 89.9 | 21.0 | 2.6 | 1.6 |
| C | 94.1 | 36.1 | 3.1 | 0.8 |
| E | 93.3 | 17.8 | 2.1 | 2.5 |
| F | 100.0 | 2.6 | 1.2 | 31.0 |
| G | 92.1 | 0.7 | 1.0 | 128.4 |

From this comparison it can be seen that, with the same operating conditions, the catalysts of the present invention (B, C and E) have a higher isomerizing activity (more than an order of magnitude) and also a lower hydrogenating activity (lower HYD/ISO ratio), with respect to the comparative catalysts.

In particular the best performances are obtained with catalyst C having a composition corresponding to a ratio $SiO_2/Al_2O_3=100$ and a molybdenum content of 10.6%. This is confirmed by the data at T=288° C. and WHSV =6.1 hours$^{-1}$ (Table 8).

TABLE 8

| Catalyst | HDS (%) | ISO (%) | HDS/HYD | HYD/ISO |
|---|---|---|---|---|
| B | 94.4 | 26.4 | 2.5 | 1.4 |
| C | 96.3 | 43.1 | 3.2 | 0.7 |
| E | 96.8 | 26.3 | 2.1 | 1.7 |

Tests on FCC Full Range Naphtha

Some examples are provided hereunder of performances of catalysts of the present invention, evaluated on FCC Full Range gasoline, characterized by the following composition:

TABLE 9

| S (ppm) | Paraff. (n + i−) | Naphthenes | olefins (n + i−) | Cyclo-olefins | aromatics | B.P. > 200° C. | RON | MON |
|---|---|---|---|---|---|---|---|---|
| 1360 | 20.4 | 9.4 | 30.3 | 5.6 | 24.8 | 8.9 | 93.3 | 80.7 | wherein S ppm is the sulfur content and columns two to six indicate the volume percentage of normal and iso paraffins, naphthenes, normal and iso olefins, cyclo-olefins, aromatics, respectively. The last column indicates the volume percentage of the fraction which boil at over 200° C.

EXAMPLE 13

Activity of Catalyst B 2 g of catalyst B prepared according to example 3, diluted with corindone, are charged into a reactor (40–70 mesh) and activated in the presence of a mixture of $H_2S/H_2$ (10% vol $H_2$), up to 400° C., for 3 hours; the system is then brought under a pressure of $H_2$ up to 10 bars, sending the feed consisting of FCC Full Range gasoline having the composition of Table 9, onto the catalyst with a ratio $H_2$/hydrocarbon charge of 300 Nl/l and WHSV of 4 hours$^{-1}$. The operating conditions and catalytic results are indicated in Table 10.

TABLE 10

| S (ppm) | T(° C.) | Paraff. (n + i−) | Naphthenes | Olefins (n + i−) | Aromatics | B.P. > 200° C. | RON | MON |
|---|---|---|---|---|---|---|---|---|
| 501 | 272 | 26.3 | 9.8 | 24.8 | 25.1 | 9.4 | 92.4 | 81.2 |
| 277 | 288 | 29.2 | 10.5 | 21.6 | 24.8 | 9.5 | 91.0 | 80.3 |
| 127 | 304 | 33.3 | 11.2 | 18.7 | 24.4 | 9.5 | 90.1 | 80.2 |

EXAMPLE 14

Activity of Catalyst C 2 g of catalyst C prepared according to example 4, diluted with corindone, are charged into a reactor (40–70 mesh) and activated in the presence of a mixture of H$_2$S/H$_2$ (10% vol H$_2$), up to 400° C., for 3 hours; the system is then brought under a pressure of H$_2$ up to 10 bars, sending the feed consisting of FCC Full Range gasoline (see Table 9), onto the catalyst with a ratio H$_2$/hydrocarbon charge of 300 Nl/l and WHSV=4.4 h$^{-1}$.

The operating conditions and catalytic results are indicated in Table 11.

TABLE 11

| S (ppm) | T(° C.) | Paraff. (n + i−) | Naphthenes | Olefins (n + i−) | Aromatics | B.P. > 200° C. | RON | MON |
|---|---|---|---|---|---|---|---|---|
| 538 | 252 | 24.6 | 9.6 | 26.8 | 24.8 | 9.5 | — | 81.0 |
| 224 | 272 | 26.2 | 9.9 | 24.8 | 24.9 | 9.7 | 91.7 | 80.9 |
| 115 | 287 | 27.8 | 10.4 | 22.8 | 25.0 | 10.0 | 91.5 | 80.7 |

EXAMPLE 15

Activity of Catalyst F—Comparative 2 g of catalyst F prepared according to example 7, diluted with corindone, are charged into a reactor (40–70 mesh) and activated in the presence of a mixture of H$_2$S/H$_2$ (10% vol H$_2$), up to 400° C., for 3 hours; the system is then brought under a pressure of H$_2$ up to 10 bars, sending the feed consisting of FCC Full Range gasoline (see Table 9), onto the catalyst, with a ratio H$_2$/hydrocarbon charge of 300 Nl/l and WHSV=4 h$^{-1}$.

The operating conditions and catalytic results of the gasoline thus obtained are indicated in Table 12.

TABLE 12

| S (ppm) | T(° C.) | Paraff. (n + i−) | Naphthenes | Olefins (n + i−) | Aromatics | B.P. > 200° C. | RON | MON |
|---|---|---|---|---|---|---|---|---|
| 886 | 230 | 22.8 | 10.0 | 27.8 | 23.3 | 10.4 | 92.3 | 80.3 |
| 551 | 248 | 24.2 | 10.3 | 26.5 | 23.2 | 10.2 | 91.8 | 80.2 |
| 158 | 269 | 28.6 | 11.3 | 21.7 | 23.4 | 9.7 | 89.3 | 79.3 |

Table 13 compares the variations in the octane qualities of the products obtained with catalysts B, C and F, at 90% of HDS conversion. The catalysts of the present invention (B and C) have a lower loss, in terms of both RON and MON, with respect to F; catalyst C is, in particular, the one which ensures the lowest loss.

TABLE 13

| Catalyst | ΔRON | ΔMON | Δ(RON + MON/2) |
|---|---|---|---|
| B | −3.2 | −0.5 | −1.85 |
| C | −1.8 | 0 | −0.9 |
| F | −4.0 | −1.4 | −2.7 |

The invention claimed is:

1. A process of hydrodesulfurizing a hydrocarbon mixture, which comprises:

reacting said hydrocarbon mixture containing olefins and boiling within the range of C$_4$ to 250° C., and having a sulfur content of at least 150 ppm with hydrogen at a temperature ranging from 250° C. to 330° C., at a pressure ranging from 5 to 10 kg/cm$^2$, at a WHSV ranging from 2 to 6 hours$^{-1}$ and with a quantity of hydrogen ranging from 200 to 400 times the quantity of hydrocarbons present (Nl/l) in the presence of a catalytic composition comprising:

a) an acidic carrier consisting of a silica and alumina gel, amorphous to X-rays, with a molar ratio SiO$_2$/Al$_2$O$_3$ of 30/1 to 500/1, having a surface area ranging from 500 to 1000 m²/g, a porosity of 0.3 to 0.6 ml/g and a pore diameter within the range of 10–40 Å; and b) a mixture of molybdenum and cobalt deposited on the carrier in an overall quantity ranging from 2 to 67% by weight with respect to the total amount of components (a)+(b), thereby effecting said hydrodesulfurization with concomitant skeletal isomerization of the olefins of said mixture under the hydrogenation conditions of the process which results in a ratio HYD/ISO ranging from 0.7 to 2.5, wherein HYD is the ratio of non-isomerized olefins, that have been hydrogenated, to olefins in the hydrocarbon mixture and ISO is the ratio of isomerized, hydrogenated and non-hydrogenated olefins to the sum of isomerized, hydrogenated and non-hydrogenated, olefins and non-isomerized, hydrogenated and non-hydrogenated, olefins.

2. The process according to claim 1, wherein the acid carrier of the catalyst has a ratio $SiO_2/Al_2O_3$ ranging from 50/1 to 300/1 and a porosity of 0.4 to 0.5 ml/g.

3. The process according to claim 1, wherein molybdenum is present in a quantity ranging from 5 to 50% by weight with respect to the total of the carrier and the mixture of metals and the metal of Group VIII cobalt is present in a quantity ranging from 0.5 to 10% by weight with respect to the total of the carrier and the mixture of metals.

4. The process according to claim 3, wherein molybdenum is present in a quantity ranging from 8 to 30% by weight and cobalt is present in a quantity ranging from 1 to 5% by weight.

5. The process according to claim 1, wherein the molar ratio of cobalt to molybdenum is less than or equal to 2.

6. The process according to claim 5, wherein the molar ratio is less than or equal to 1.

7. The process according to claim 1, wherein the silica and alumina gel carrier is in the form of an extruded product with a ligand.

8. The process according to claim 7, wherein the ligand is selected from the group consisting of aluminum oxide, boehmite and pseudoboehmite.

9. The process according to claim 7, wherein the silica and alumina gel carrier and the ligand are premixed in a weight ratio ranging from 30:70 to 90:10 and consolidated into the desired end-form.

10. The process according to claim 7, wherein the silica and alumina gel in extruded form is prepared as follows:

a) preparing an aqueous solution of a tetraalkylammonium hydroxide (TAA-OH), a soluble compound of aluminum capable of hydrolyzing to $Al_2O_3$ and a silicon compound capable of hydrolyzing to $SiO_2$, in the following molar ratios:
$SiO_2/Al_2O_3$ from 30/1 to 500/1;
TAA-OH/SiO2 from 0.05/1 to 0.2/1;
$H_2O/SiO_2$ from 5/1 to 40/1;

b) heating the solution thus obtained to cause hydrolysis and gelation thereby preparing a mixture A with a viscosity ranging from 0.01 to 100 Pa sec;

c) adding to the mixture A first a ligand belonging to the group of boehmites and pseudoboehmites, in a weight ratio with the mixture A of 0.05 to 0.5, and then a mineral or organic acid in a quantity ranging from 0.5 to 8 g per 100 g of ligand;

d) mixing and heating the mixture obtained in step (c) to a temperature ranging from 40° to 90° C. until a homogeneous paste is obtained, which is subjected to extrusion; and e) drying the extruded product and calcining the dried product in an oxidizing atmosphere.

11. The process according to claim 1, wherein the hydrocarbon mixture which is subjected to desulfurization contains more than 600 ppm of sulfur.

12. The process according to claim 1, wherein the hydrocarbon mixture which is subjected to hydrodesulfurization is a mixture that boils within the range of $C_5$ to 220° C.

13. The process according to claim 1, wherein the catalyst is activated by sulfidation.

14. The process according to claim 1, wherein the hydrocarbon mixture is a full range naphtha having a boiling range of 35° –250° C.

15. A process of hydrodesulfurizing a hydrocarbon mixture, which comprises:

reacting said hydrocarbon mixture containing olefins and boiling within the range of $C_4$ to 250° C., and having a sulfur content of at least 150 ppm with hydrogen at a temperature ranging from 250° C. to 330° C., at a pressure ranging from 5 to 10 kg/cm2, at a WHSV ranging from 2 to 6 hours$^{-1}$ and with a quantity of hydrogen ranging from 200 to 400 times the quantity of hydrocarbons present (Nl/l) in the presence of a catalytic composition comprising:

a) an acidic carrier consisting of a silica and alumina gel, amorphous to X-rays, with a molar ratio $SiO_2/Al_2O_3$ of 30/1 to 500/1, having a surface area ranging from 500 to 1000 m²/g, a porosity of 0.3 to 0.6 ml/g and a pore diameter within the range of 10–40 Å; and b) a mixture of molybdenum and cobalt deposited on the carrier in an overall quantity ranging from 2 to 67% by weight with respect to the total amount of components (a)+(b), thereby effecting said hydrodesulfurization with concomitant skeletal isomerization of the olefins of said mixture under the hydrogenation conditions of the process which results in a ratio HYD/ISO ranging from 0.7 to 2.5, wherein HYD is the ratio of non-isomerized olefins, that have been hydrogenated, to olefins in the hydrocarbon mixture and ISO is the ratio of isomerized, hydrogenated and non-hydrogenated, olefins to the sum of isomerized, hydrogenated and non-hydrogenated, olefins and non-isomerized, hydrogenated and non-hydrogenated, olefins and which results in a ratio HDS/HYD of at least 1.9, wherein HDS is hydrodesulfurization conversion and HYD is as defined above.

* * * * *